United States Patent
Bravi et al.

(10) Patent No.: US 11,120,687 B2
(45) Date of Patent: Sep. 14, 2021

(54) SYSTEMS AND METHODS FOR UTILIZING A MACHINE LEARNING MODEL TO IDENTIFY PUBLIC PARKING SPACES AND FOR PROVIDING NOTIFICATIONS OF AVAILABLE PUBLIC PARKING SPACES

(71) Applicant: Verizon Connect Development Limited, Dublin (IE)

(72) Inventors: Luca Bravi, Scandicci (IT); Tommaso Mugnai, Figline e Incisa Valdarno (IT); Alessandro Giannini, Prato (IT)

(73) Assignee: Verizon Connect Development Limited, Dublin (IE)

( * ) Notice: Subject to any disclaimer, the term of this patent is extended or adjusted under 35 U.S.C. 154(b) by 0 days.

(21) Appl. No.: 16/673,306

(22) Filed: Nov. 4, 2019

(65) Prior Publication Data

US 2021/0134155 A1    May 6, 2021

(51) Int. Cl.
| | |
|---|---|
| *G08G 1/14* | (2006.01) |
| *G05D 1/02* | (2020.01) |
| *G06N 20/00* | (2019.01) |
| *G06F 16/9537* | (2019.01) |

(52) U.S. Cl.
CPC .......... *G08G 1/143* (2013.01); *G05D 1/0221* (2013.01); *G06F 16/9537* (2019.01); *G06N 20/00* (2019.01)

(58) Field of Classification Search
CPC .... G08G 1/143; G06N 20/00; G06F 16/9537; G05D 1/0221
See application file for complete search history.

(56) References Cited

U.S. PATENT DOCUMENTS

| | | | |
|---|---|---|---|
| 10,040,482 B1 * | 8/2018 | Jung | B62D 15/0285 |
| 2014/0340242 A1 * | 11/2014 | Belzner | G08G 1/143 |
| | | | 340/932.2 |
| 2019/0019407 A1 * | 1/2019 | Nakhjavani | G06K 9/00812 |
| 2020/0307554 A1 * | 10/2020 | Lai | B60W 30/06 |

* cited by examiner

*Primary Examiner* — Daryl C Pope

(57) ABSTRACT

A device may receive geographical data identifying a geographical area, and may receive, from vehicle devices of vehicles, first vehicle data identifying engine off conditions, locations during engine off conditions, and durations of the engine off conditions. The device may divide, based on the geographical data, the geographical area into clusters with particular dimensions, and may process data identifying the clusters and the first vehicle data, with a machine learning model, to determine parking data identifying public parking spaces in the geographical area. The device may receive, from a set of the vehicle devices associated with vehicles parked in the public parking spaces, vehicle data identifying engine on conditions and locations during the engine on conditions, and may identify available public parking spaces based on the second vehicle data and the parking data. The device may perform one or more actions based on data identifying the available public parking spaces.

20 Claims, 12 Drawing Sheets

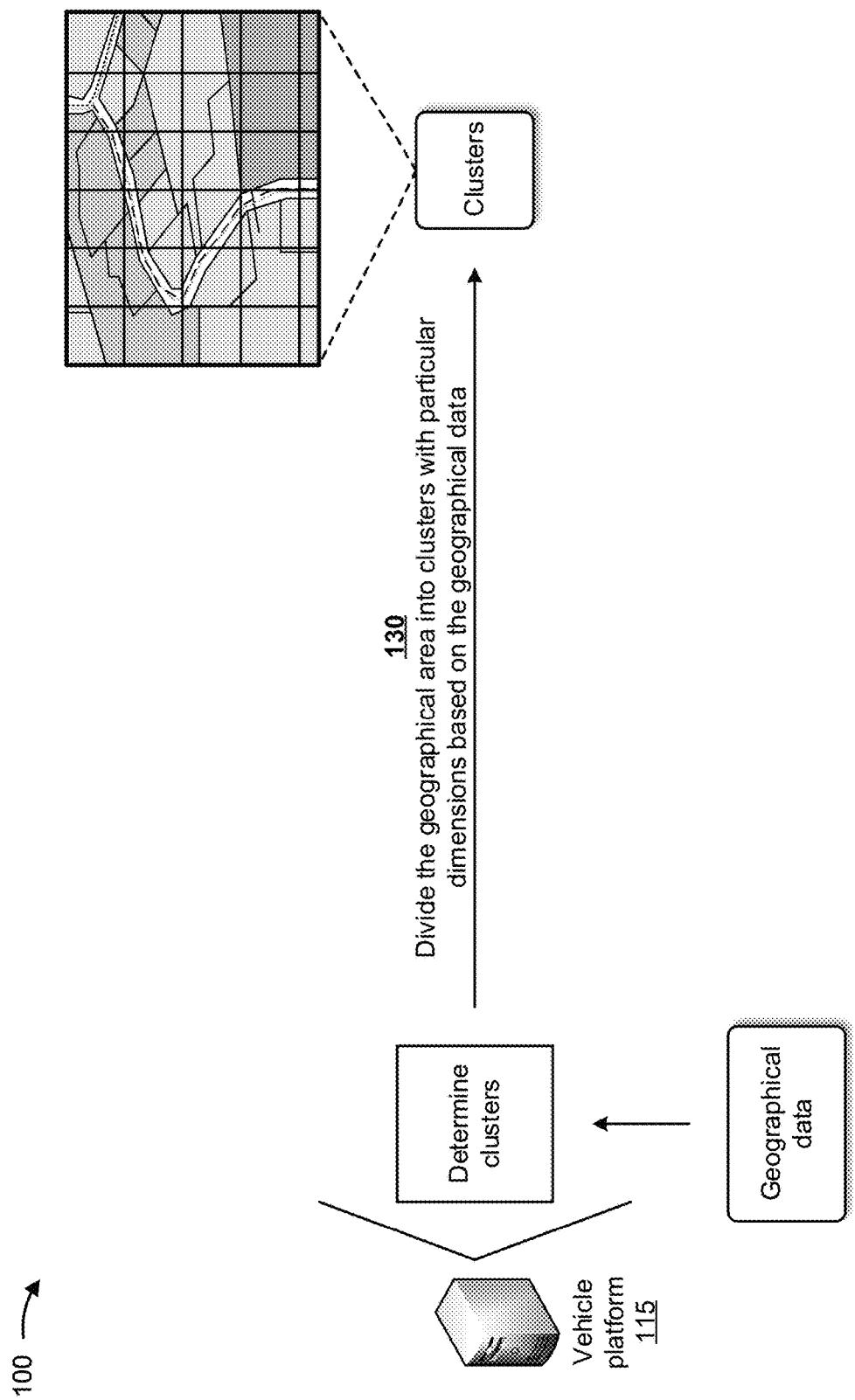

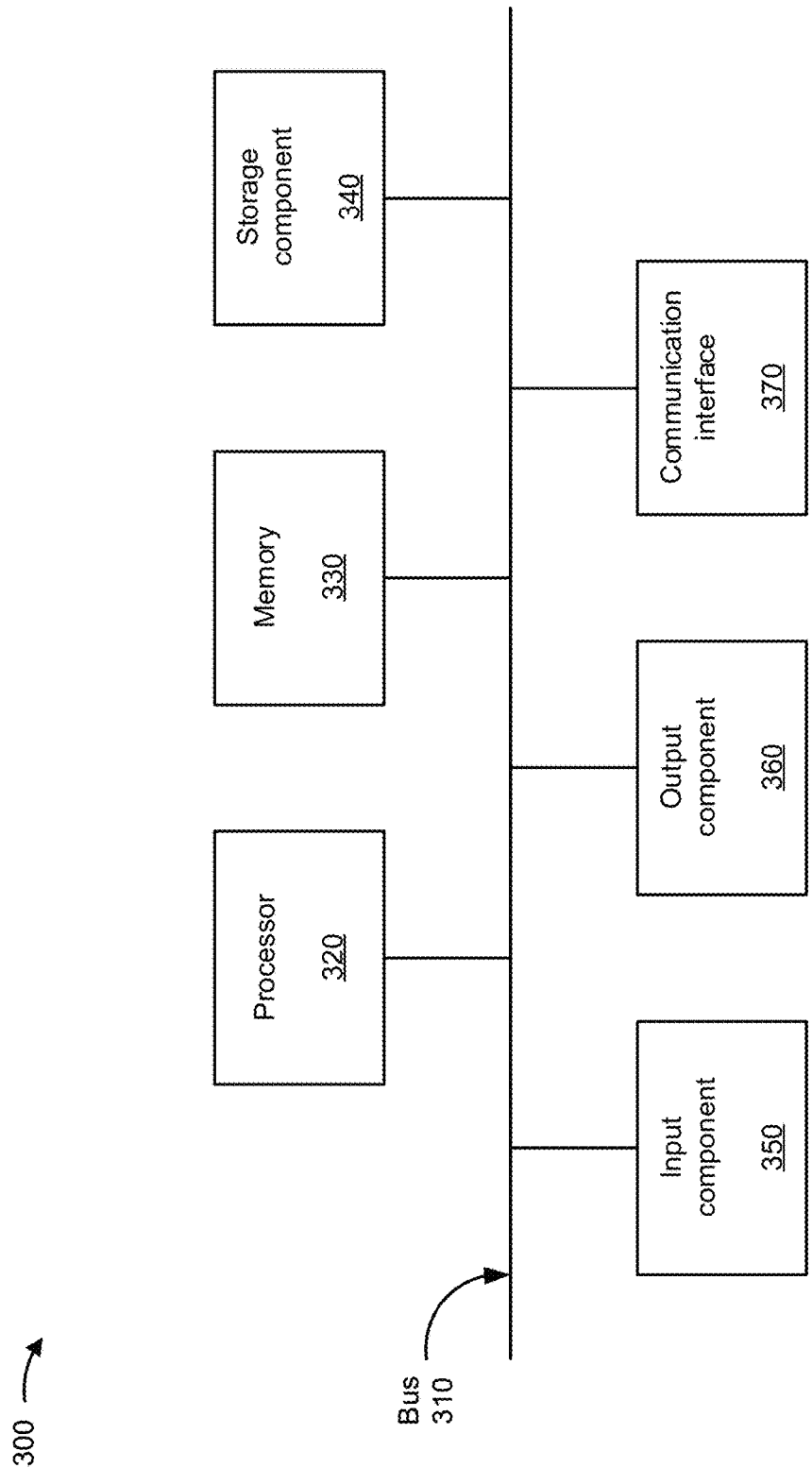

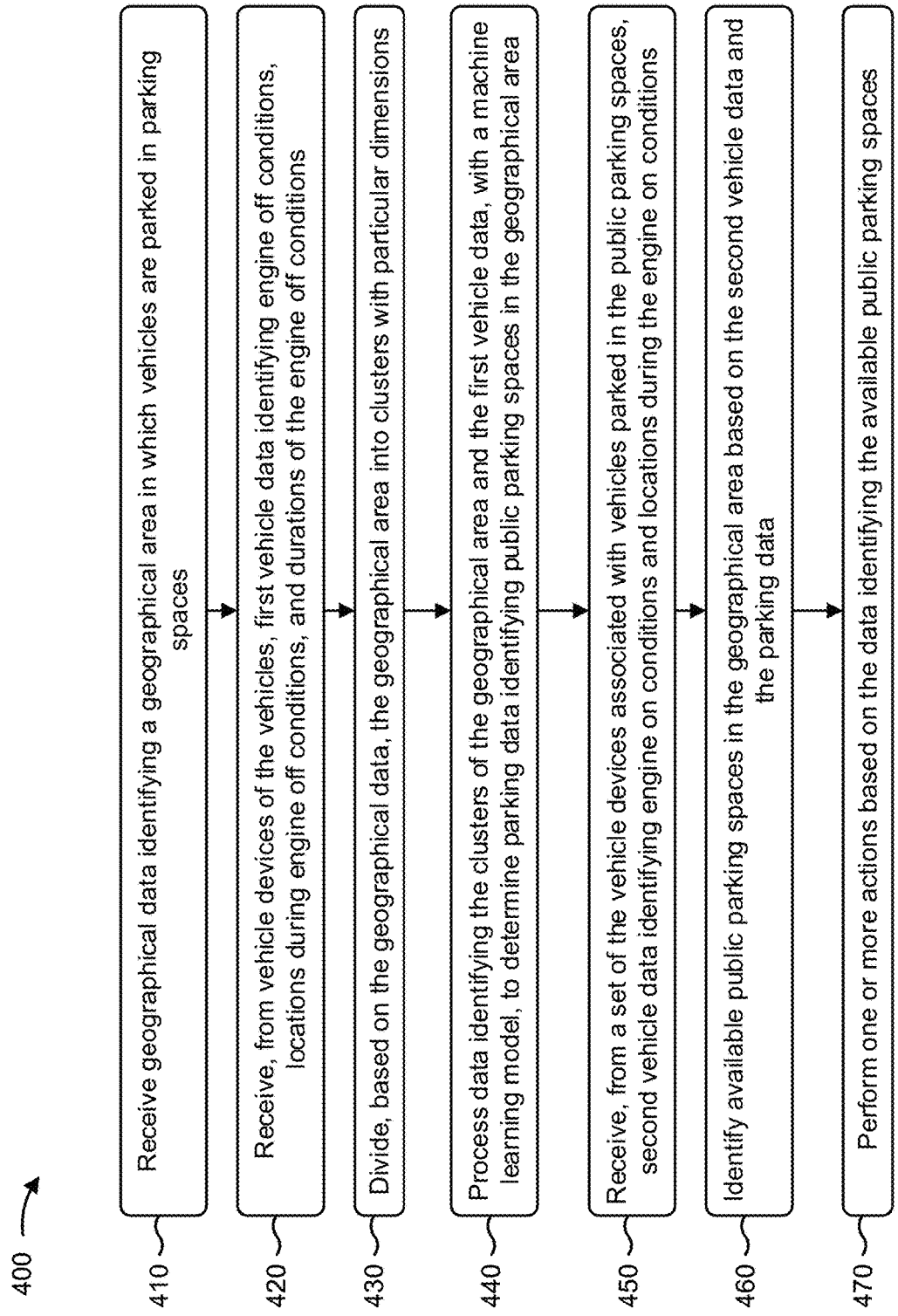

SYSTEMS AND METHODS FOR UTILIZING A MACHINE LEARNING MODEL TO IDENTIFY PUBLIC PARKING SPACES AND FOR PROVIDING NOTIFICATIONS OF AVAILABLE PUBLIC PARKING SPACES

BACKGROUND

A vehicle may be parked in a private parking space (e.g., in a parking lot of an employer, in a monthly fee-based parking lot, and/or the like) or a public parking space (e.g., in a public parking lot, a roadside parking space, a metered parking space, and/or the like). Locating a public parking space may be time consuming, difficult, and aggravating for a vehicle driver.

BRIEF DESCRIPTION OF THE DRAWINGS

FIGS. 1A-1I are diagrams of one or more example implementations described herein.

FIG. 3 is a diagram of example components of one or more devices of FIG. 2.

FIG. 4 is a flow chart of an example process for utilizing a machine learning model to identify public parking spaces and for providing notifications of available public parking spaces.

DETAILED DESCRIPTION OF PREFERRED EMBODIMENTS

The following detailed description of example implementations refers to the accompanying drawings. The same reference numbers in different drawings may identify the same or similar elements.

When searching for a parking space in a geographical area, a vehicle operator may drive around the geographical area and visually search for an open parking space. Furthermore, some parking spaces are subject to restrictions (e.g., time limits, no parking at a particular time period, vehicle type restrictions, and/or the like), and locating free or public parking spaces is even more difficult in urban environments. Thus, searching for and locating a free or public parking space requires luck and patience, wastes time, wastes fuel, causes unnecessary pollution, can be very frustrating, and/or the like.

Some implementations described herein provide a vehicle platform that utilizes a machine learning model to identify public parking spaces and provides notifications of available public parking spaces. In some implementations, the vehicle platform may be utilized with a particular fleet of vehicles. For example, the vehicle platform may receive geographical data identifying a geographical area in which vehicles are parked in parking spaces, and may receive, from vehicle devices of the vehicles, real-time vehicle data identifying engine off conditions, locations during engine off conditions, and durations of the engine off conditions. This real-time information may be stored as first vehicle data for future analysis purposes. The vehicle platform may divide, based on the geographical data, the geographical area into clusters with particular dimensions, and may process data identifying the clusters of the geographical area and the first vehicle data, with a machine learning model, to determine parking data identifying public parking spaces in the geographical area. The vehicle platform may receive, from a set of the vehicle devices associated with vehicles parked in the public parking spaces, vehicle data identifying engine on conditions and locations during the engine on conditions, and may identify available public parking spaces in the geographical area based on the second vehicle data and the parking data. The vehicle platform may store data identifying the available public parking spaces in a data structure, and may perform one or more actions based on the data identifying the available public parking spaces.

In this way, the vehicle platform utilizes a machine learning model to identify public parking spaces and provides notifications of available public parking spaces, which enables vehicle operators (e.g., of a particular vehicle fleet) to quickly and easily locate the available public parking spaces. Thus, the vehicle platform reduces time required to locate public parking spaces, conserves transportation resources, reduces pollution, eliminates unnecessary traffic (which, e.g., reduces potential accidents), and/or the like.

Figure 1A:
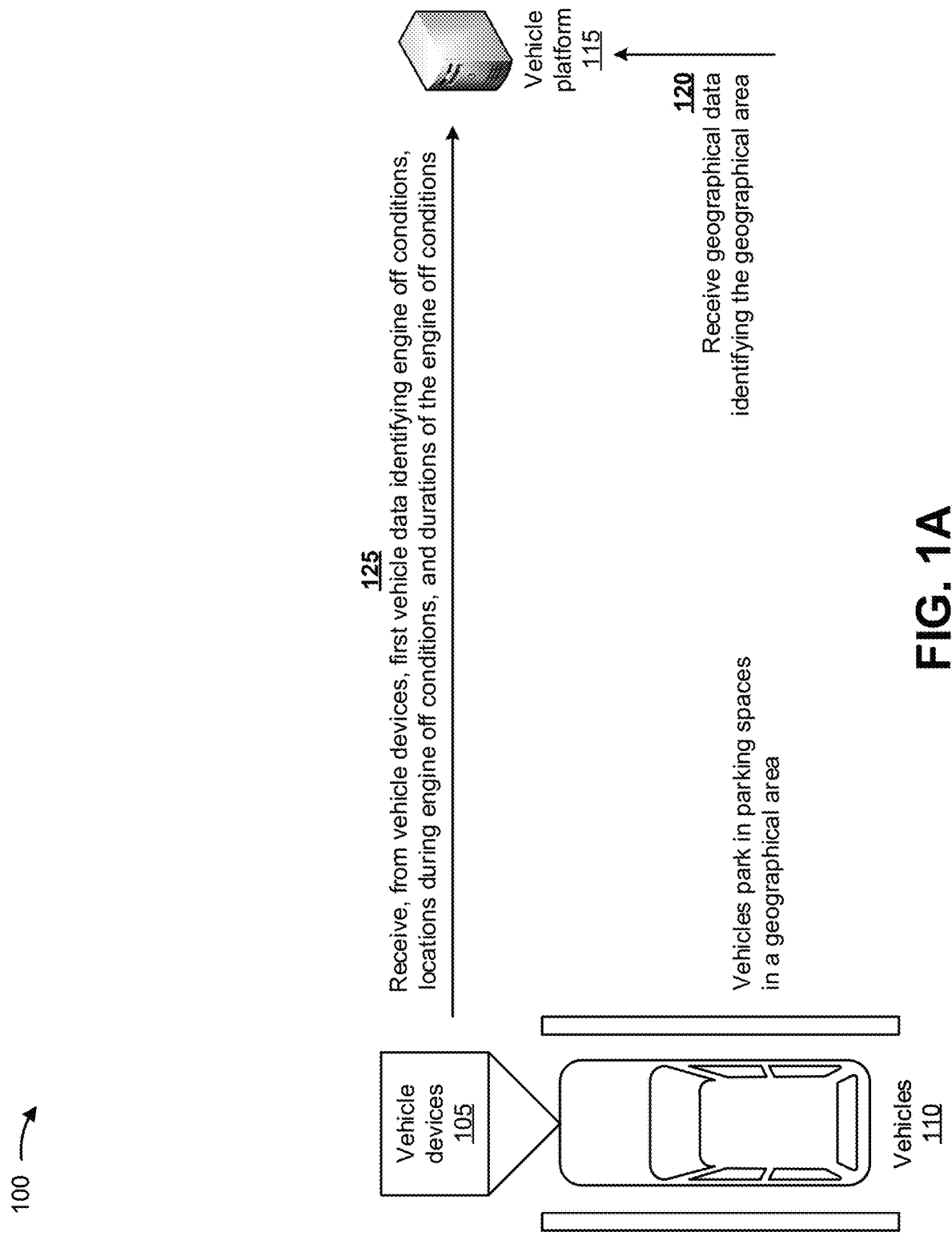

FIGS. 1A-1I are diagrams of one or more example implementations 100 described herein. As shown in FIG. 1A, vehicle devices 105 may be associated with vehicles 110 and a vehicle platform 115, and vehicles 110 may park in parking spaces in a geographical area. In some implementations, vehicle devices 105 may include devices (e.g., on-board diagnostic (OBD) devices, electronic control units (ECUs), and/or the like) that receive vehicle data (e.g., engine on condition, engine off condition, data indicating acceleration, speed, movement, and/or the like) and control other vehicle devices, vehicle sensors that capture the second vehicle data, devices (e.g., dash cameras, parking assist cameras, backup assist cameras, and/or the like) that capture images or video, vehicle infotainment systems, vehicle navigation systems, and/or the like associated with vehicles 110. Vehicle platform 115 may include a platform that utilizes a machine learning model to identify public parking spaces (e.g., for vehicles 110) and provides notifications of available public parking spaces (e.g., to vehicle devices 105).

As further shown in FIG. 1A, and by reference number 120, vehicle platform 115 may receive geographical data identifying the geographical area. In some implementations, the geographical data may include data identifying global position system (GPS) coordinates of geographical boundaries that define the geographical area; points of interest within the geographical area; roads, streets, highways, parking lots, parking spaces, and/or the like within the geographical area; and/or the like. For example, the geographical area may be a city, and the geographical data may include data identifying GPS coordinates of boundaries of the city; points of interest within the city; roads, streets, highways, parking lots, parking spaces, and/or the like within the city; and/or the like.

As further shown in FIG. 1A, and by reference number 125, vehicle platform 115 may receive, from vehicle devices 105, first vehicle data identifying engine off conditions, locations during engine off conditions, and durations of the engine off conditions. In some implementations, vehicle platform 115 may receive the first vehicle data from vehicle devices 105 associated with vehicles 110 that are parked in parking spaces within the geographical area. In some implementations, vehicle platform 115 may determine a stop event to have occurred (e.g., indicating that a vehicle 110 may be likely parked) if a duration of the engine off condition (e.g., an amount of time the engine of a vehicle 110 is turned off) satisfies an engine off duration parameter. The engine off duration parameter may include a configurable threshold period of time (e.g., ten minutes, twenty minutes, thirty minutes, one hour, and/or the like) during which the engines of vehicles are turned off). For example, vehicle platform 115 may determine stop events to have occurred for vehicles 110 if durations of the engine off conditions for vehicles 110 are thirty or more minutes.

In some implementations, vehicle platform 115 may store the first vehicle data and data identifying the stop events in a data structure (e.g., a database, a table, a list, and/or the like) associated with vehicle platform 115. In some implementations, vehicle platform 115 may periodically receive the first vehicle data after a time period associated with a start collection time period parameter (e.g., every ten days, every twenty days, every thirty days, and/or the like). In some implementations, vehicle platform 115 may receive and/or store the first vehicle data with a collection frequency associated with a collection frequency parameter (e.g., for twenty days, for thirty days, for forty days, and/or the like).

As shown in FIG. 1B, and by reference number 130, vehicle platform 115 may divide the geographical area into clusters with particular dimensions based on the geographical data. The particular dimensions may be associated with a cluster dimension parameter that defines the particular dimensions of the clusters. For example, vehicle platform 115 may divide the geographical area into clusters such that each cluster is associated with a particular area (e.g., a ten meter by ten meter area, a twenty meter by twenty meter area, and/or the like) provided within the geographical area. Each particular area may be separate from and not overlap with other particular areas adjacent to each particular area. Although FIG. 1B shows the clusters being divided by square areas, in some implementations, the clusters may be divided in other ways, such as by rectangular areas, triangular areas, circular areas, areas with varying dimensions, and/or the like.

Figure 1C:
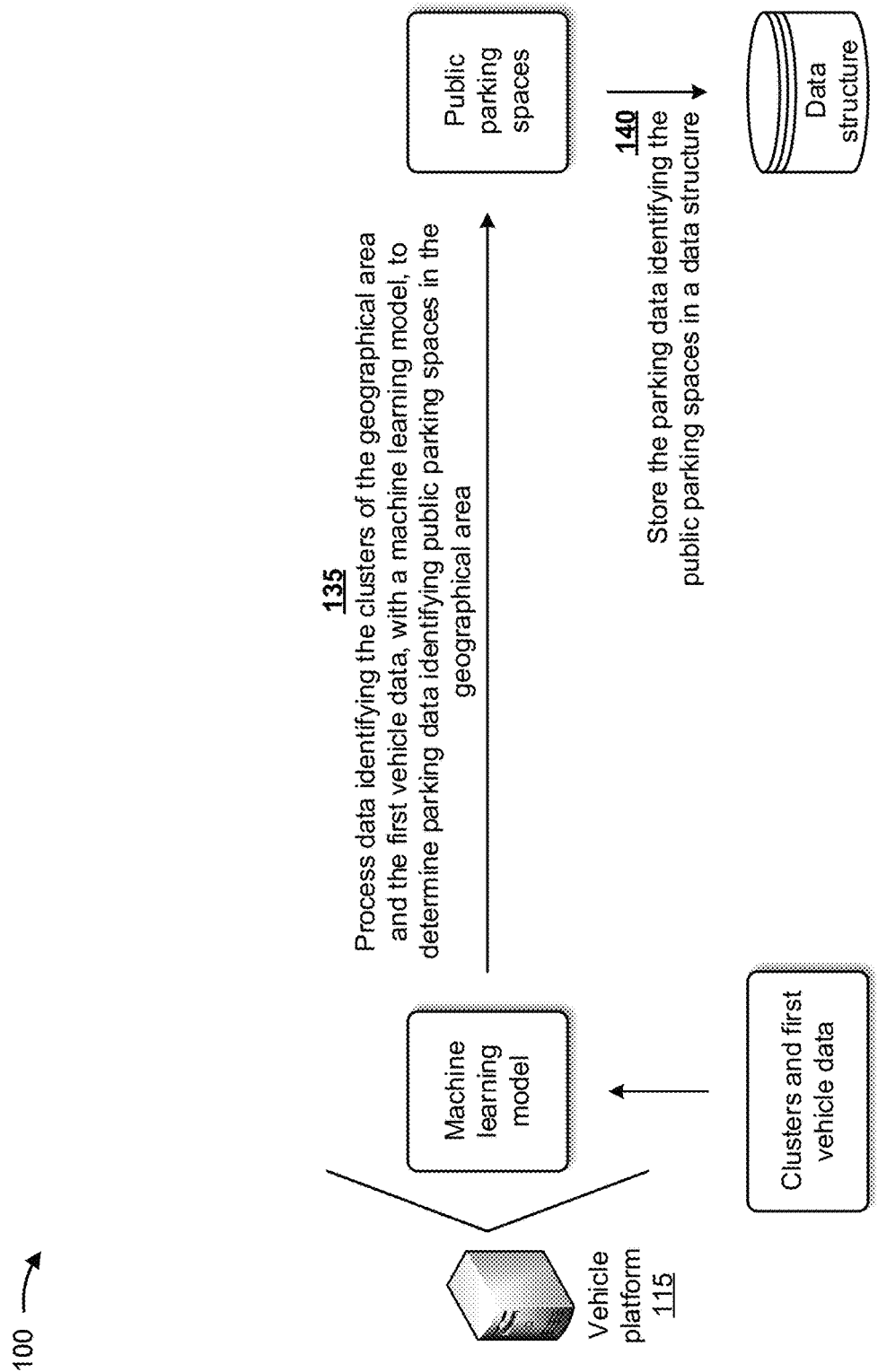

As shown in FIG. 1C, and by reference number 135, vehicle platform 115 may process data identifying the clusters of the geographical area and the first vehicle data, with a machine learning model, to determine parking data identifying public parking spaces in the geographical area. In some implementations, the machine learning model may include a clustering machine learning model.

In some implementations, when determining the parking data, vehicle platform 115 may limit the first vehicle data to only first vehicle data associated with clusters that include at least a quantity of stop events associated with a stop event parameter (e.g., a threshold quantity of stop events). For example, vehicle platform 115 may limit the first vehicle data to only first vehicle data associated with clusters that include at least forty, fifty, sixty, and/or the like stop events within a time period associated with the collection frequency parameter. In this way, vehicle platform 115 may increase likelihoods that parking spaces are public parking spaces based on a quantity of times that vehicles 110 appear to have parked in the parking spaces.

In some implementations, when determining the parking data, vehicle platform 115 may limit the first vehicle data to only first vehicle data associated with clusters that include at least a quantity of accounts (e.g., accounts associated with subscribers, users, and/or the like of vehicle platform 115) associated with an account quantity parameter (e.g., a threshold quantity of accounts). For example, vehicle platform 115 may limit the first vehicle data to only first vehicle data associated with clusters that include at least three, four, five, six, and/or the like different accounts associated with vehicle devices 105, vehicles 110, drivers of vehicles 110, and/or the like. In this way, vehicle platform 115 may increase likelihoods that parking spaces are public parking spaces based on a quantity of different vehicles 110 that appear to have parked in the parking spaces.

In some implementations, when processing the data identifying the clusters of the geographical area and the first vehicle data to determine the parking data identifying public parking spaces in the geographical area, the machine learning model may utilize the engine off duration parameter to determine stop events, may utilize the start collection period parameter and/or the collection frequency parameter to determine the first vehicle data to analyze, may utilize the cluster dimension parameter to determine the cluster dimensions of clusters to analyze, may utilize the quantity of stop events associated with the stop event parameter to determine which clusters to analyze, may utilize the quantity of accounts associated with the account quantity parameter to determine which clusters to consider, and/or the like. In some implementations, one or more of the parameters may be selectable and/or adjustable, may remain constant, and/or the like during processing by the machine learning model. For example, the machine learning model may adjust one or more of the parameters to optimize an accuracy and/or an efficiency of the machine learning model in determining the parking data identifying public parking spaces in the geographical area. A user of vehicle platform 115 may set initial values for one or more of the parameters, and the machine learning model may adjust the values. For example, the machine learning model may adjust the cluster dimension parameter to smaller dimensions in order to more accurately identify public parking spaces, may adjust the cluster dimension parameter to larger dimensions in order to identify public parking spaces and conserve computing resources, and/or the like.

In some implementations, vehicle platform 115 may process the data identifying the clusters of the geographical area and the first vehicle data with a machine learning model that has been trained with historical data (e.g., geographical data, historical vehicle data, data identifying clusters of the geographical data, and/or the like) to identify public parking spaces in a geographical area. In some implementations, when training the machine learning model, vehicle platform 115 may separate the historical data into a training set, a validation set, a test set, and/or the like. The training set may be utilized to train the machine learning model. The validation set may be utilized to validate results of the trained machine learning model. The test set may be utilized to test operation of the machine learning model.

In some implementations, vehicle platform 115 may train the machine learning model using, for example, an unsupervised training procedure. For example, vehicle platform 115 may perform dimensionality reduction to reduce the historical data to a minimum feature set, thereby reducing resources (e.g., processing resources, memory resources, and/or the like) to train the machine learning model, and may apply a classification technique to the minimum feature set.

In some implementations, vehicle platform 115 may use a logistic regression classification technique to determine a categorical outcome (e.g., that the data identifying the clusters of the geographical area and the first vehicle data identify a public parking space). Additionally, or alternatively, vehicle platform 115 may use a naïve Bayesian classifier technique. In this case, vehicle platform 115 may perform binary recursive partitioning to split the historical data into partitions and/or branches and use the partitions and/or branches to determine outcomes (e.g., that the data identifying the clusters of the geographical area and the first vehicle data identify a public parking space). Based on using recursive partitioning, vehicle platform 115 may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, vehicle platform 115 may use a support vector machine (SVM) classifier technique to generate a non-linear boundary between data points in the training set. In this case, the non-linear boundary is used to classify test data into a particular class.

Additionally, or alternatively, vehicle platform 115 may train the machine learning model using a supervised training procedure that includes receiving input to the machine learning model from a subject matter expert, which may reduce an amount of time, an amount of processing resources, and/or the like to train the machine learning model relative to an unsupervised training procedure. In some implementations, vehicle platform 115 may use one or more other model training techniques, such as a neural network technique, a latent semantic indexing technique, and/or the like. For example, vehicle platform 115 may perform an artificial neural network processing technique (e.g., using a two-layer feedforward neural network architecture, a three-layer feedforward neural network architecture, and/or the like) to perform pattern recognition with regard to patterns of the historical data. In this case, using the artificial neural network processing technique may improve an accuracy of the trained machine learning model generated by vehicle platform 115 by being more robust to noisy, imprecise, or incomplete data, and by enabling vehicle platform 115 to detect patterns and/or trends undetectable to human analysts or systems using less complex techniques.

In some implementations, rather than training the machine learning model, vehicle platform 115 may receive a trained machine learning model from another device (e.g., a server device). For example, a server device may generate the trained machine learning model based on having trained machine learning model in a manner similar to that described above, and may provide the trained machine learning model to vehicle platform 115 (e.g., may pre-load vehicle platform 115 with the trained machine learning model, may receive a request from vehicle platform 115 for the trained machine learning models, and/or the like).

As further shown in FIG. 1C, and by reference number 140, vehicle platform 115 may store the parking data identifying the public parking spaces in a data structure associated with vehicle platform 115. In some implementations, vehicle platform 115 may store the parking data in association with additional data. For example, vehicle platform 115 may store the parking data in association with rules that define circumstances under which parking is allowed in the public parking spaces. The rules may define days during which parking is allowed in the public parking spaces, times of day in which parking is allowed in the public parking spaces, and/or the like.

Figure 1D:
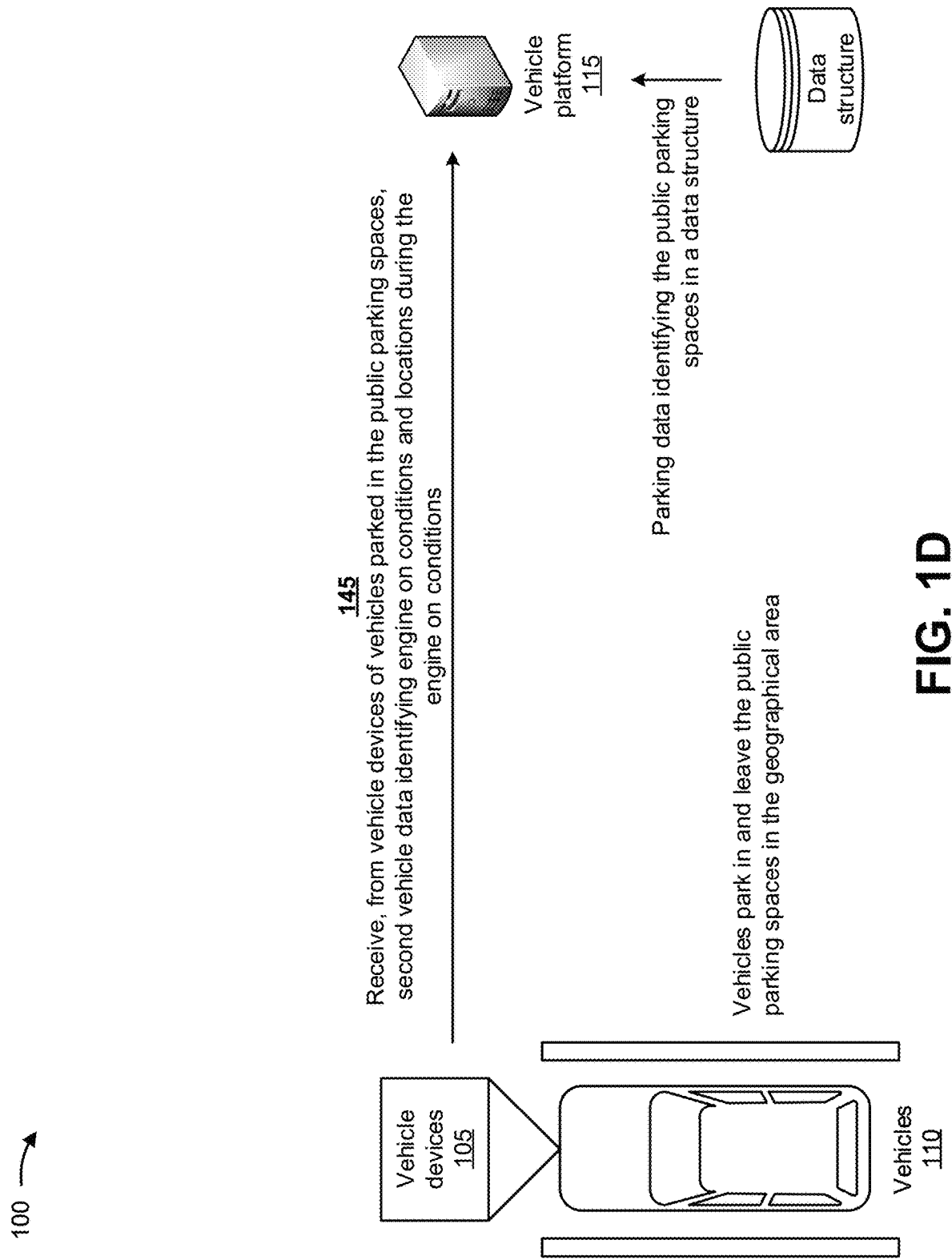

As shown in FIG. 1D, vehicle platform 115 may receive, from the data structure, the parking data identifying the public parking spaces. As further shown in FIG. 1D, and by reference number 145, vehicle platform 115 may receive, from vehicle devices 105 of vehicles 110 parked in the public parking spaces, second vehicle data identifying engine on conditions and locations during the engine on conditions. For example, vehicles 110 may park in the public parking spaces of the geographical area and, at some point thereafter, leave the public parking spaces. Drivers of vehicles 110 may start the engines of vehicles 110 when leaving the public parking spaces, and vehicle devices 105 of vehicles 110 may provide indications of engine on conditions to vehicle platform 115. The engine on conditions may provide indications that vehicles 110 are leaving the public parking spaces and that the spaces will become available.

In some implementations, vehicle platform 115 may utilize additional and/or other information to identify public parking spaces that are available or potentially becoming available. For example, vehicle platform 115 may monitor when a user device (e.g., a smart phone) of a driver of vehicle 110 is approaching a public parking space in which vehicle 110 is parked, and may determine that the public parking space may become available soon based on a location of the user device approaching a location of the public parking space. As another example, vehicle platform 115 may obtain video data and/or lidar data from vehicle devices 105, and may utilize the video data and/or lidar data to identify available public parking spaces near vehicles 110.

Figure 1E:
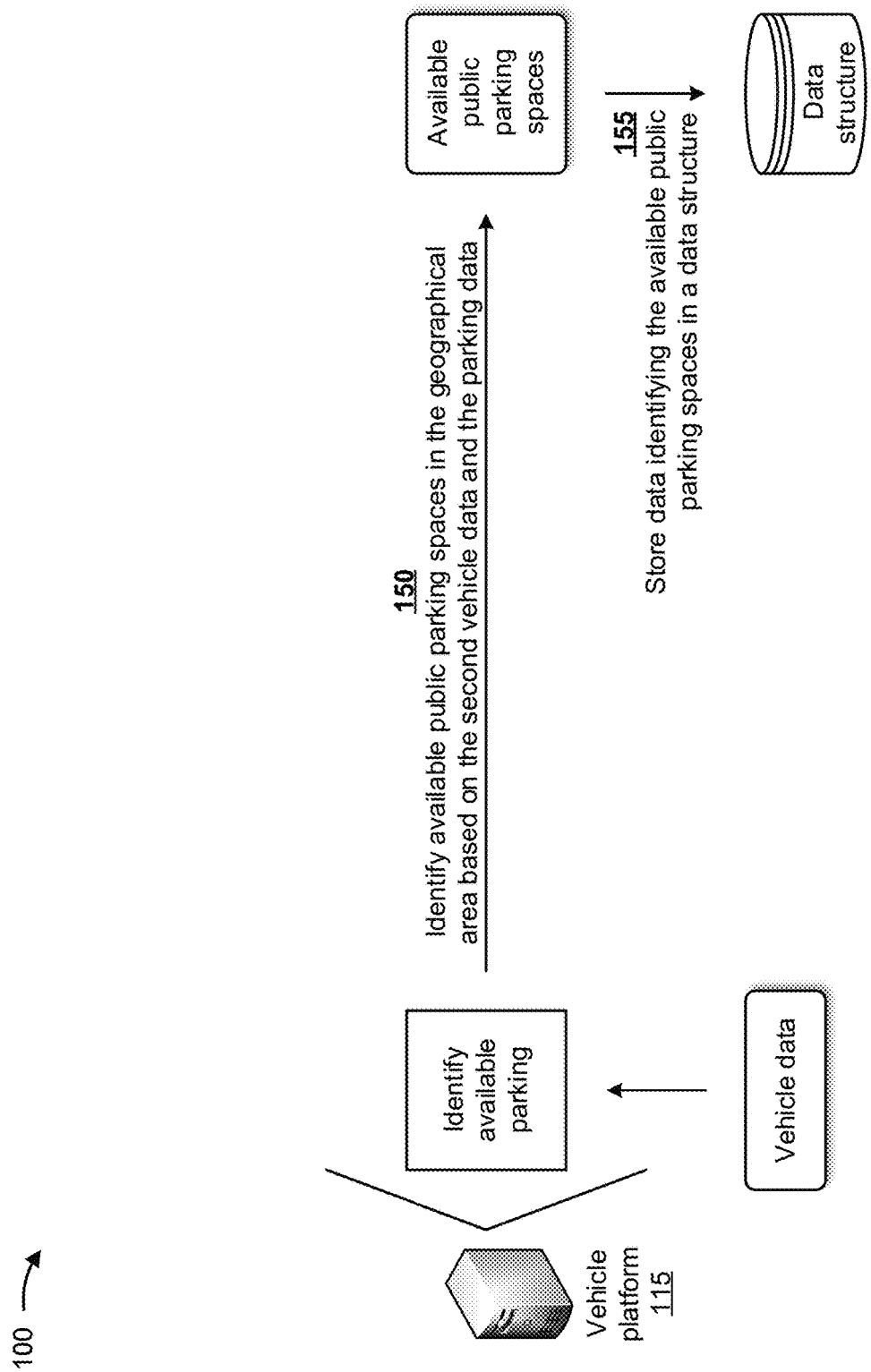

As shown in FIG. 1E, and by reference number 150, vehicle platform 115 may identify available public parking spaces in the geographical area based on the second vehicle data and the parking data. For example, vehicle platform 115 may determine that an engine of vehicle 110 located in a parking space has been started based on the second vehicle data, and may determine that the parking space is a public parking space based on the parking data. Based on these determinations, vehicle platform 115 may determine that the public parking space may become available. In some implementations, vehicle platform 115 may obtain additional information in order to confirm that vehicles 110 are leaving public parking spaces. For example, vehicle platform 115 may determine accelerations or movements of vehicles 110 parked in the public parking spaces, and may identify the available public parking spaces in the geographical area based on determining the accelerations or the movements of vehicles 110 parked in the public parking spaces. In some implementations, vehicle platform 115 may obtain location data associated with vehicles 110, and may confirm that vehicle 110 has left the public parking space when the location data indicates that vehicles 110 moved a threshold distance from previous positions of vehicles 110 (e.g., the public parking spaces).

As further shown in FIG. 1E, and by reference number 155, vehicle platform 115 may store data identifying the available public parking spaces in a data structure associated with vehicle platform 115. In some implementations, vehicle platform 115 may cause the data structure to remove data identifying old available parking spaces, where an old available parking space may be defined on a basis of one or more temporal thresholds that define different levels of newness. For example, a creation or storage time associated with an available parking space may be stored in the data structure.

Figure 1F:
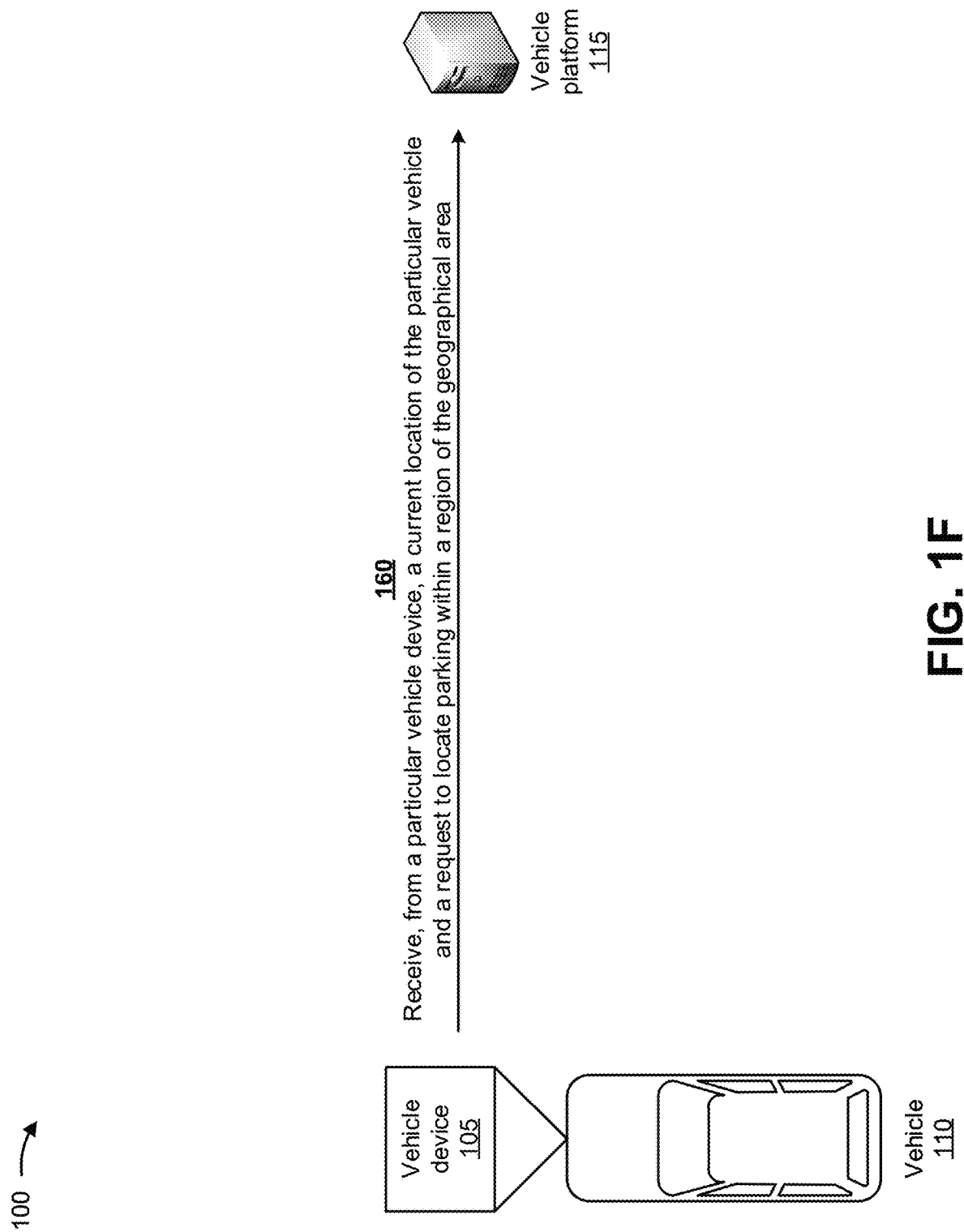

As shown in FIG. 1F, and by reference number 160, vehicle platform 115 may receive, from a particular vehicle device 105 of a particular vehicle, a current location of the particular vehicle 110 and a request to locate parking within a region of the geographical area. In some implementations, the particular vehicle device 105 may include a software application that enables the particular vehicle 110 to locate public parking spaces near the particular vehicle 110. The software application may provide a user interface via which a driver or a passenger of the particular vehicle 110 may cause the request and the current location of the particular vehicle 110 to be provided to vehicle platform 115. In some implementations, the driver or the passenger of vehicle 110 may cause the request and the current location to be provided to vehicle platform 115 via a user device of the driver or the passenger (e.g., that includes the software application). In some implementations, the user device may provide the request and the current location to the particular vehicle device 105, and the particular vehicle device 105 may provide the request and the current location to vehicle platform 115.

In some implementations, vehicle platform 115 may identify a region (e.g., a portion) of the geographical area based on the current location of the particular vehicle 110. For example, vehicle platform 115 may determine the region to be within a radius (e.g., a one mile radius, a two mile radius, and/or the like) of the current location, may determine the region based on a current direction and speed of the particular vehicle 110, a quantity of available public parking spaces within the radius (e.g., vehicle platform 115 may determine a larger radius if the radius contains few or no available public parking spaces, and/or the like. The radius, the quantity of available public parking spaces within the radius, and/or the like may be set to constant values or may be configurable (e.g., selectable, adjustable from a default value, and/or the like), such as by a driver, a passenger, and/or an owner of the particular vehicle 110, via the particular vehicle device 105, the user device of the driver, the passenger, and/or the owner, and/or the like.

In some implementations, vehicle platform 115 may determine the region of the geographical area based on another location that is different than the current location of the particular vehicle 110. For example, the driver or the passenger of the particular vehicle 110 may specify the other location via the particular vehicle device 105, via the user device of the driver or the passenger, and/or the like. In this example, vehicle platform 115 may determine the region based on the other location in a similar manner as described above with respect to determining the region based on the current location. In some implementations, the driver, the passenger, and/or the owner of the particular vehicle 110 may cause the other location to be stored in a memory associated with vehicle platform 115, particular vehicle device 105, and/or the like. In this way, if the driver attempts to park the particular vehicle 110 in the other location every day, the other location need not be input every day and may be retrieved when identified by the driver, automatically when a route is taken with a destination near the other location, and/or the like.

Figure 1G:
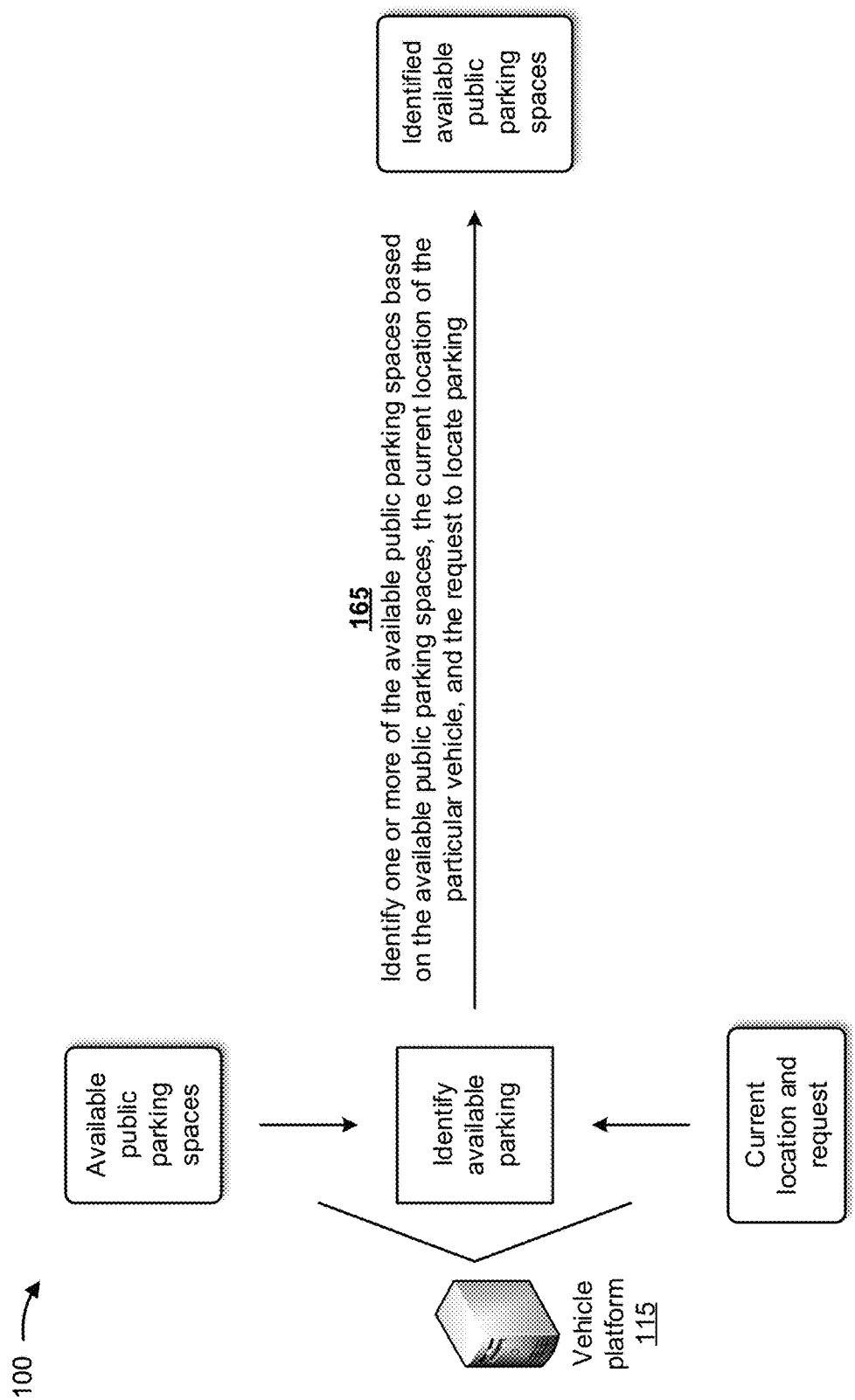

As shown in FIG. 1G, and by reference number 165, vehicle platform 115 may identify one or more of the available public parking spaces based on the available public parking spaces, the current location of the particular vehicle 110, and the request to locate parking. For example, vehicle platform 115 may identify one or more of the available public parking spaces that are within the region of the geographical area (e.g., based on the current location or the other location, as described above). In some implementations, vehicle platform 115 may identify the one or more of the available public parking spaces based on identifying, in the data identifying the available public parking spaces, data indicating available public parking spaces that are located within the region of the geographic area. In some implementations, if vehicle platform 115 is unable to identify any available public parking spaces in the region, vehicle platform 115 may expand the region to cover a greater portion of the geographical area and may identify available public parking spaces in the expanded region.

Figure 1H:
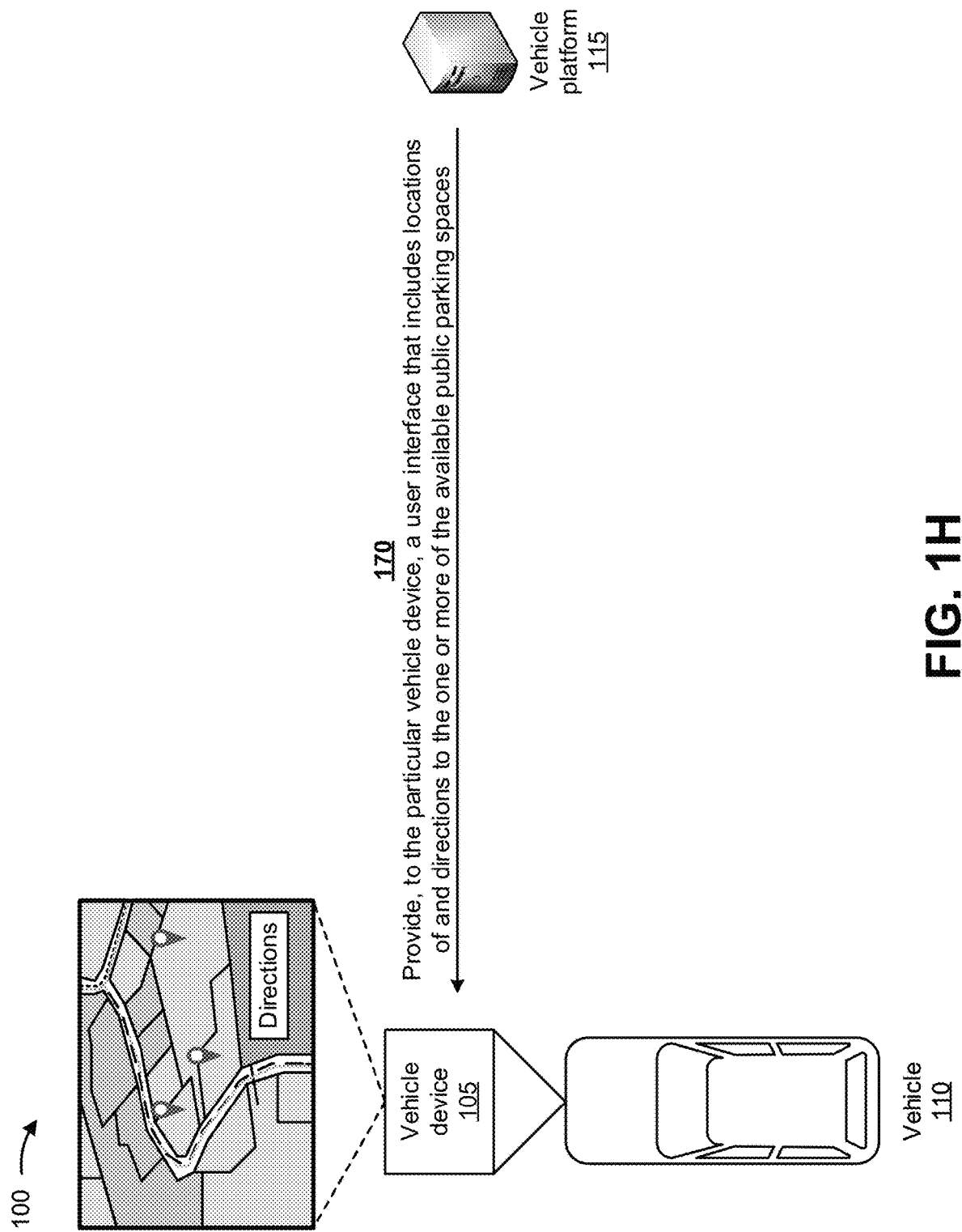

As shown in FIG. 1H, and by reference number 170, vehicle platform 115 may provide, to the particular vehicle device 105, a user interface that includes locations of and directions to the one or more of the available public parking spaces. The particular vehicle device 105 may receive the user interface and may display the user interface. In some implementations, the user interface may include representations of the one or more available public parking spaces, such as indicators (e.g., markers) of the locations, provided on a map that includes the region, a portion of the region, and/or the like. In some implementations, the user interface may include directions (e.g., a route) to the locations provided on the map, directions to a selected location provided on the map, and/or the like. In some implementations, the representations of the one or more available public parking spaces may include features (e.g., colors) that change based on when the available public parking spaces were identified. For example, colors may correspond to an amount of time that has elapsed since the available public parking spaces were identified, whether public parking spaces are already available or are soon to become available, and/or the like. In some implementations, a representation of an available public parking space may be removed from the user interface after a predetermined time period, when data indicates that the public parking space is no longer available, and/or the like.

Figure 1I:
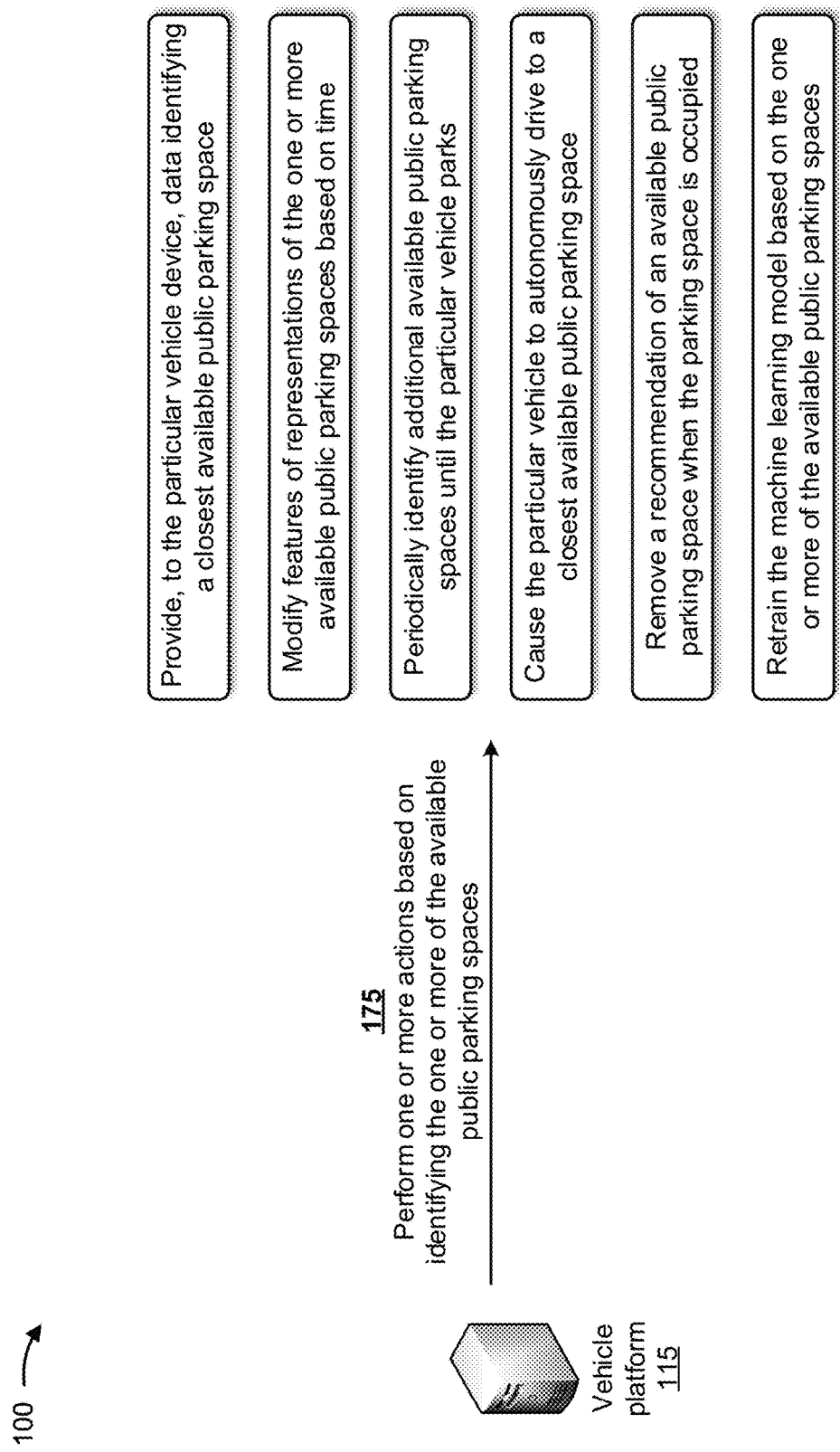

As shown in FIG. 1I, and by reference number 175, vehicle platform 115 may perform one or more actions based on identifying the one or more of the available public parking spaces. In some implementations, the one or more actions may include vehicle platform 115 providing, to the particular vehicle device 105, data identifying a closest available public parking space. For example, vehicle platform 115 may cause the particular vehicle device 105 to display (e.g., via the user interface) a representation of the closest available public parking space (e.g., as an indicator on a map, as text on a list, and/or the like), to highlight a displayed representation of the closest available public parking space (e.g., by enlarging an indicator on a map, bolding text in a list, and/or the like), and/or the like. In this way, vehicle platform 115 may enable a driver of the particular vehicle 110 to identify an available public parking space most likely to be reached quickly and efficiently, which may save time for the driver and conserve resources (e.g., computing resources, networking resources, energy resources, and/or the like) associated with vehicle platform 115, the particular vehicle 110, the vehicle device 105, and/or the like that would otherwise be wasted further searching for an available public parking space. Additionally, this may reduce the chances of a traffic accident, vehicle issues, and/or the like by reducing an amount of time and distance traveled by the particular vehicle 110 before an available public parking space is located, thereby conserving resources that might otherwise be expended treating injuries, repairing damage, handling vehicle accidents, handling legal actions, and/or the like.

In some implementations, the one or more actions may include vehicle platform 115 modifying features of the representations of the one or more available public parking spaces based on time. For example, vehicle platform 115 may cause the particular vehicle device 105 to display (e.g., via the user interface) markers on a map that include colors that correspond to an amount of time that has elapsed since the available public parking spaces were identified, and may modify the colors over an elapsed time. For example, the user interface may display the markers in a first color (e.g., green) if the elapsed time is less than five minutes, may display the markers in a second color (e.g., orange) if the elapsed time is at least five minutes but less than ten minutes, may display the markers in a third color (e.g., red) if the elapsed time is at least ten minutes but less than fifteen minutes, and may remove the markers if the elapsed time is at least fifteen minutes. Vehicle platform 115 may periodically update the user interface as the elapsed time increases for each available public parking space, and may change the colors accordingly. In this way, vehicle platform 115 may enable a driver of the particular vehicle 110 to identify an available public parking space most likely to still be available, thereby increasing a likelihood that the driver of the particular vehicle 110 will be able to park in the identified space. This may save time for the driver and conserve resources that would otherwise be wasted further searching for an available public parking space, may reduce the chances of a traffic accident or vehicle issues, and may conserve resources associated handling the traffic accident or the vehicle issues.

In some implementations, the one or more actions may include vehicle platform 115 periodically identifying additional available public parking spaces until the particular vehicle 110 parks in an available public parking space. For example, vehicle platform 115 may continuously update the user interface with newly identified available public parking spaces based on a current location of the particular vehicle 110. In this way, vehicle platform 115 may alert a driver of the particular vehicle 110 to newly available public parking spaces, thereby increasing the driver's chances of finding an available public parking space quickly and efficiently, which may save time for the driver. This may conserve resources that would otherwise be wasted further searching for an available public parking space, may reduce the chances of a traffic accident or vehicle issues, and may conserve resources associated handling the traffic accident or the vehicle issues.

In some implementations, the one or more actions may include vehicle platform 115 causing the particular vehicle 110 to autonomously drive to a closest available public parking space. For example, the particular vehicle 110 may utilize directions to the closest available public parking space to safely drive the particular vehicle 110 to the closest available publicly parking space. In this way, the particular vehicle 110 may automatically drive to an available public parking space without requiring the driver to navigate to the available public parking space or operate the particular vehicle 110. This improve navigation to and parking the particular vehicle 110, which may conserve resources that would otherwise be wasted attempting to follow directions to the closest available public parking space, handling a traffic accident caused by the driver, handling legal issues associated with the traffic accidence, and/or the like.

In some implementations, the one or more actions may include vehicle platform 115 removing a recommendation of an available public parking space when the parking space is occupied. For example, a representation of an available public parking space may be removed from the user interface after a predetermined time period, when data indicates that the public parking space is no longer available, and/or the like. In this way, vehicle platform 115 may prevent a driver from attempting to park in a parking space that is no longer available, and may allow the driver to proceed to a next available parking space, which may save time and conserve resources that would otherwise be wasted traveling to the parking space that is no longer available, and may allow the driver to more quickly identify and park in a publicly available parking space.

In some implementations, the one or more actions may include vehicle platform 115 retraining the machine learning model based on the one or more of the available public parking spaces. In this way, vehicle platform 115 may improve the accuracy of the machine learning model in identifying available public parking spaces, which may improve speed and efficiency of the machine learning model and conserve computing resources, network resources, and/or the like.

In this way, several different stages of the process for identifying public parking spaces and providing notifications of available public parking spaces are automated via machine learning, which may remove human subjectivity and waste from the process, and which improves speed and efficiency of the process and conserves computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that utilizes a machine learning model to identify public parking spaces and provides notifications of available public parking spaces in the manner described herein. Finally, the process for utilizing a machine learning model to identify public parking spaces and for providing notifications of available public parking spaces reduces time required to locate public parking spaces, conserves transportation resources, reduces pollution, eliminates unnecessary traffic (which reduces potential accidents), and/or the like.

As indicated above, FIGS. 1A-1I are provided merely as examples. Other examples may differ from what was described with regard to FIGS. 1A-1I. The number and arrangement of devices and networks shown in FIGS. 1A-1I are provided as an example. In practice, there may be additional devices and/or networks, fewer devices and/or networks, different devices and/or networks, or differently arranged devices and/or networks than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) of FIGS. 1A-1I may perform one or more functions described as being performed by another set of devices of FIGS. 1A-1I.

Figure 2:
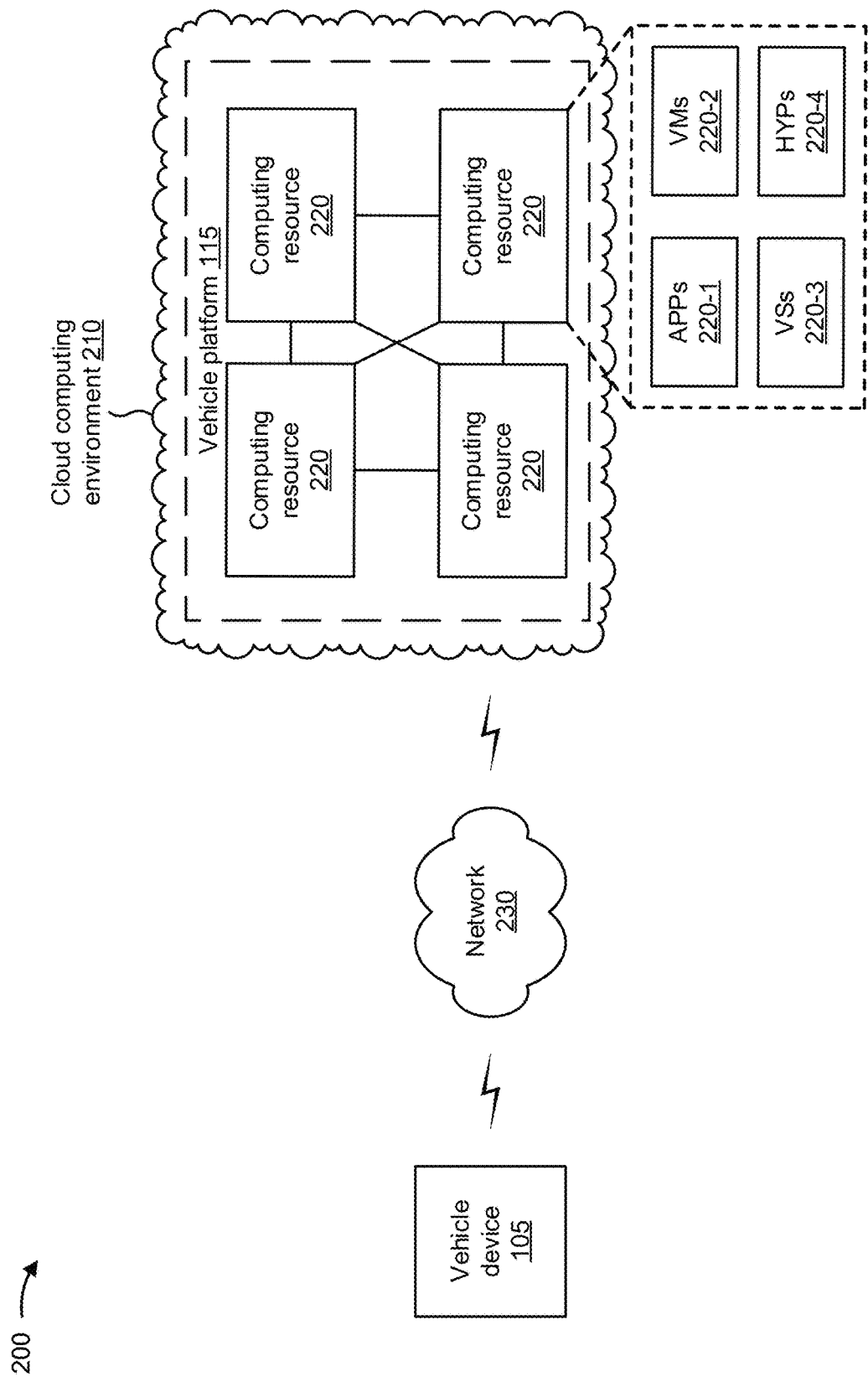
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include vehicle device 105, vehicle platform 115, and a network 230. Devices of environment 200 may interconnect via wired connections, wireless connections, or a combination of wired and wireless connections.

Vehicle device 105 includes one or more devices capable of receiving, generating, storing, processing, and/or providing information, such as information described herein. For example, vehicle device 105 may include a mobile phone (e.g., a smart phone, a radiotelephone, etc.), a laptop computer, a tablet computer, a handheld computer, a device included in vehicle 110 (e.g., an inertial measurement unit, a three-axis accelerometer, a global positioning system (GPS) device, an OBD device, an ECU, a dash camera, a parking assist camera, a backup assist camera, a vehicle infotainment system, a vehicle navigation system, and/or the like) or a similar type of device. In some implementations, one or more vehicle devices 105 may utilize machine learning to identify vehicle surroundings, route conditions, and/or points of interest based on captured images or video. In some implementations, vehicle device 105 may receive information from and/or transmit information to vehicle platform 115.

Vehicle platform 115 includes one or more devices that utilize a machine learning model to identify public parking spaces and provide notifications of available public parking spaces. In some implementations, vehicle platform 115 may be designed to be modular such that certain software components may be swapped in or out depending on a particular need. As such, vehicle platform 115 may be easily and/or quickly reconfigured for different uses. In some implementations, vehicle platform 115 may receive information from and/or transmit information to one or more vehicle devices 105.

In some implementations, as shown, vehicle platform 115 may be hosted in a cloud computing environment 210. Notably, while implementations described herein describe vehicle platform 115 as being hosted in cloud computing environment 210, in some implementations, vehicle platform 115 may not be cloud-based (i.e., may be implemented outside of a cloud computing environment) or may be partially cloud-based.

Cloud computing environment 210 includes an environment that hosts vehicle platform 115. Cloud computing environment 210 may provide computation, software, data access, storage, etc., services that do not require end-user knowledge of a physical location and configuration of system(s) and/or device(s) that hosts vehicle platform 115. As shown, cloud computing environment 210 may include a group of computing resources 220 (referred to collectively as "computing resources 220" and individually as "computing resource 220").

Computing resource 220 includes one or more personal computers, workstation computers, mainframe devices, or other types of computation and/or communication devices. In some implementations, computing resource 220 may host vehicle platform 115. The cloud resources may include compute instances executing in computing resource 220, storage devices provided in computing resource 220, data transfer devices provided by computing resource 220, etc. In some implementations, computing resource 220 may communicate with other computing resources 220 via wired connections, wireless connections, or a combination of wired and wireless connections.

As further shown in FIG. 2, computing resource 220 includes a group of cloud resources, such as one or more applications ("APPs") 220-1, one or more virtual machines ("VMs") 220-2, virtualized storage ("VSs") 220-3, one or more hypervisors ("HYPs") 220-4, and/or the like.

Application 220-1 includes one or more software applications that may be provided to or accessed by vehicle device 105. Application 220-1 may eliminate a need to install and execute the software applications on vehicle device 105. For example, application 220-1 may include software associated with vehicle platform 115 and/or any other software capable of being provided via cloud computing environment 210. In some implementations, one application 220-1 may send/receive information to/from one or more other applications 220-1, via virtual machine 220-2.

Virtual machine 220-2 includes a software implementation of a machine (e.g., a computer) that executes programs like a physical machine. Virtual machine 220-2 may be either a system virtual machine or a process virtual machine, depending upon use and degree of correspondence to any real machine by virtual machine 220-2. A system virtual machine may provide a complete system platform that supports execution of a complete operating system ("OS"). A process virtual machine may execute a single program and may support a single process. In some implementations, virtual machine 220-2 may execute on behalf of a user (e.g., a user of vehicle device 105 or an operator of vehicle platform 115), and may manage infrastructure of cloud computing environment 210, such as data management, synchronization, or long-duration data transfers.

Virtualized storage 220-3 includes one or more storage systems and/or one or more devices that use virtualization techniques within the storage systems or devices of computing resource 220. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 220-4 may provide hardware virtualization techniques that allow multiple operating systems (e.g., "guest operating systems") to execute concurrently on a host computer, such as computing resource 220. Hypervisor 220-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

FIG. 3 is a diagram of example components of a device 300. Device 300 may correspond to vehicle device 105, vehicle platform 115, and/or computing resource 220. In some implementations, vehicle device 105, vehicle platform 115, and/or computing resource 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for utilizing a machine learning model to identify public parking spaces and for providing notifications of available public parking spaces. In some implementations, one or more process blocks of FIG. 4 may be performed by a device (e.g., vehicle platform 115). In some implementations, one or more process blocks of FIG. 4 may be performed by another device or a group of devices separate from or including the device, such as a vehicle device (e.g., vehicle device 105).

As shown in FIG. 4, process 400 may include receiving geographical data identifying a geographical area in which vehicles are parked in parking spaces (block 410). For example, the device (e.g., using computing resource 220, processor 320, communication interface 370, and/or the like) may receive geographical data identifying a geographical area in which vehicles are parked in parking spaces, as described above.

As further shown in FIG. 4, process 400 may include receiving, from vehicle devices of the vehicles, first vehicle data identifying engine off conditions, locations during engine off conditions, and durations of the engine off conditions (block 420). For example, the device (e.g., using computing resource 220, processor 320, communication interface 370, and/or the like) may receive, from vehicle devices of the vehicles, first vehicle data identifying engine off conditions, locations during engine off conditions, and durations of the engine off conditions, as described above.

As further shown in FIG. 4, process 400 may include dividing, based on the geographical data, the geographical area into clusters with particular dimensions (block 430). For example, the device (e.g., using computing resource 220, processor 320, memory 330, and/or the like) may divide, based on the geographical data, the geographical area into clusters with particular dimensions, as described above.

As further shown in FIG. 4, process 400 may include processing data identifying the clusters of the geographical area and the first vehicle data, with a machine learning model, to determine parking data identifying public parking spaces in the geographical area (block 440). For example, the device (e.g., using computing resource 220, processor 320, storage component 340, and/or the like) may process data identifying the clusters of the geographical area and the first vehicle data, with a machine learning model, to determine parking data identifying public parking spaces in the geographical area, as described above. In some implementations, processing the data identifying the clusters of the geographical area and the first vehicle data, with a machine learning model, to determine the parking data may include establishing a threshold time period associated with the durations of the engine off conditions; establishing a threshold quantity of the engine off conditions; establishing a threshold quantity of the vehicles associated with the engine off conditions; and determining the parking data identifying the public parking spaces in the geographical area based on the threshold time period, the threshold quantity of the engine off conditions, and the threshold quantity of the vehicles associated with the engine off conditions.

In some implementations, processing the data identifying the clusters of the geographical area and the first vehicle data, with the machine learning model, to determine the parking data may include periodically processing, over a predetermined time period, the data identifying the clusters of the geographical area and the first vehicle data, with the machine learning model, to determine the parking data.

As further shown in FIG. 4, process 400 may include receiving, from a set of the vehicle devices associated with vehicles parked in the public parking spaces, vehicle data identifying engine on conditions and locations during the engine on conditions (block 450). For example, the device (e.g., using computing resource 220, processor 320, communication interface 370, and/or the like) may receive, from a set of the vehicle devices associated with vehicles parked in the public parking spaces, vehicle data identifying engine on conditions and locations during the engine on conditions, as described above.

As further shown in FIG. 4, process 400 may include identifying available public parking spaces in the geographical area based on the second vehicle data and the parking data (block 460). For example, the device (e.g., using computing resource 220, processor 320, memory 330, and/or the like) may identify available public parking spaces in the geographical area based on the second vehicle data and the parking data, as described above.

As further shown in FIG. 4, process 400 may include performing one or more actions based on the data identifying the available public parking spaces (block 470). For example, the device (e.g., using computing resource 220, processor 320, memory 330, storage component 340, communication interface 370, and/or the like) may perform one or more actions based on the data identifying the available public parking spaces, as described above. In some implementations, performing the one or more actions may include receiving, from a particular vehicle device of a particular vehicle, a current location of the particular vehicle and a request to locate parking within a region of the geographical area; identifying one or more of the available public parking spaces based on the data identifying the available public parking spaces, the current location of the particular vehicle, and the request to locate parking; and providing, to the particular vehicle device, a user interface that includes locations of and directions to the one or more of the available public parking spaces.

In some implementations, performing the one or more actions may include modifying, over time, representations of the one or more of the available public parking spaces in the user interface to generate a modified user interface; and providing the modified user interface to the particular vehicle device.

In some implementations, performing the one or more actions may include periodically identifying additional available public parking spaces, of the available public parking spaces, based on the data identifying the available public parking spaces, the current location of the particular vehicle, and the request to locate parking; and providing, to the particular vehicle device, another user interface that includes locations of and directions to the additional available public parking spaces.

In some implementations, performing the one or more actions may include determining that a particular available public parking space, of the one or more of the available public parking spaces, has become occupied; modifying the user interface to remove a location of and directions to the particular available public parking space and to generate a modified user interface; and providing the modified user interface to the particular vehicle device.

Process 400 may include additional implementations, such as any single implementation or any combination of implementations described below and/or in connection with one or more other processes described elsewhere herein.

In some implementations, process 400 may include determining accelerations or movements of the vehicles parked in the public parking spaces, and identifying the available public parking spaces in the geographical area based on the second vehicle data and the parking data may include identifying the available public parking spaces in the geographical area based on determining the accelerations or the movements of the vehicles parked in the public parking spaces.

In some implementations, process 400 may include identifying a closest available public parking space, of the available public parking spaces and to the particular vehicle, based on the data identifying the available public parking spaces, the current location of the particular vehicle, and the request to locate parking; and providing, to the particular vehicle device, data identifying the closest available public parking space. In some implementations, process 400 may include causing the particular vehicle to autonomously drive to the closest available public parking space.

In some implementations, process 400 may include determining that the closest available public parking space has become occupied; identifying a next closest available public parking space, of the available public parking spaces and to the particular vehicle, based on determining that the closest available public parking space has become occupied; and providing, to the particular vehicle device, data identifying the next closest available public parking space.

In some implementations, process 400 may include receiving additional parking data identifying one or more public parking lots; modifying the parking data, based on the additional parking data, to generate modified parking data; and identifying the available public parking spaces in the geographical area based on the second vehicle data and the modified parking data.

In some implementations, process 400 may include reducing the particular dimensions of the clusters of the geographical area, where reducing the particular dimensions increases an accuracy of the parking data identifying public parking spaces in the geographical area relative to the parking data associated with the particular dimensions.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
   receiving, by a device, geographical data identifying a geographical area in which vehicles are parked in parking spaces;
   receiving, by the device and from vehicle devices of the vehicles, first vehicle data identifying engine off conditions, locations during engine off conditions, and durations of the engine off conditions;
   dividing, by the device and based on the geographical data, the geographical area into clusters with particular dimensions;
   processing, by the device, data identifying the clusters of the geographical area and the first vehicle data, with a machine learning model, to determine parking data identifying public parking spaces in the geographical area;
   receiving, by the device and from a set of the vehicle devices associated with vehicles parked in the public parking spaces, second vehicle data identifying engine on conditions and locations during the engine on conditions;
   identifying, by the device, available public parking spaces in the geographical area based on the second vehicle data and the parking data; and
   performing, by the device, one or more actions based on the data identifying the available public parking spaces.

2. The method of claim 1, wherein processing the data identifying the clusters of the geographical area and historical vehicle data, with a machine learning model, to determine the parking data comprises:
   establishing a threshold time period associated with the durations of the engine off conditions;
   establishing a threshold quantity of the engine off conditions;
   establishing a threshold quantity of the vehicles associated with the engine off conditions; and
   determining the parking data identifying the public parking spaces in the geographical area based on the threshold time period, the threshold quantity of the engine off conditions, and the threshold quantity of the vehicles associated with the engine off conditions.

3. The method of claim 1, wherein performing the one or more actions comprises:
   receiving, from a particular vehicle device of a particular vehicle, a current location of the particular vehicle and a request to locate parking within a region of the geographical area;
   identifying one or more of the available public parking spaces based on the data identifying the available public parking spaces, the current location of the particular vehicle, and the request to locate parking; and
   providing, to the particular vehicle device, a user interface that includes locations of and directions to the one or more of the available public parking spaces.

4. The method of claim 3, wherein performing the one or more actions further comprises:
   periodically identifying additional available public parking spaces, of the available public parking spaces, based on the data identifying the available public parking spaces, the current location of the particular vehicle, and the request to locate parking,
   wherein the additional available public parking spaces are identified until the particular vehicle parks; and
   providing, to the particular vehicle device, another user interface that includes locations of and directions to the additional available public parking spaces.

5. The method of claim 3, wherein performing the one or more actions further comprises:
   determining that a particular available public parking space, of the one or more of the available public parking spaces, has become occupied;
   modifying the user interface to remove a location of and directions to the particular available public parking space and to generate a modified user interface; and
   providing the modified user interface to the particular vehicle device.

6. The method of claim 1, further comprising:
   determining accelerations or movements of the vehicles parked in the public parking spaces,
   wherein identifying the available public parking spaces in the geographical area based on the second vehicle data and the parking data comprises:

identifying the available public parking spaces in the geographical area based on determining the accelerations or the movements of the vehicles parked in the public parking spaces.

7. A device, comprising:
one or more processors configured to:
receive geographical data identifying a geographical area in which vehicles are parked in parking spaces;
receive, from vehicle devices of the vehicles, first vehicle data identifying engine off conditions, locations during engine off conditions, and durations of the engine off conditions;
divide, based on the geographical data, the geographical area into clusters with particular dimensions;
process data identifying the clusters of the geographical area and the first vehicle data, with a machine learning model, to determine parking data identifying public parking spaces in the geographical area;
receive, from a set of the vehicle devices associated with vehicles parked in the public parking spaces, second vehicle data identifying engine on conditions and locations during the engine on conditions;
identify available public parking spaces in the geographical area based on the second vehicle data and the parking data;
receive, from a particular vehicle device of a particular vehicle, a current location of the particular vehicle and a request to locate parking within a region of the geographical area;
identify one or more of the available public parking spaces based on the data identifying the available public parking spaces, the current location of the particular vehicle, and the request to locate parking; and
provide, to the particular vehicle device, a user interface that includes locations of and directions to the one or more of the available public parking spaces.

8. The device of claim 7, wherein the one or more processors are further configured to:
identify a closest available public parking space, of the available public parking spaces and to the particular vehicle, based on the data identifying the available public parking spaces, the current location of the particular vehicle, and the request to locate parking; and
provide, to the particular vehicle device, data identifying the closest available public parking space.

9. The device of claim 7, wherein the one or more processors are further configured to:
determine that the closest available public parking space has become occupied;
identify a next closest available public parking space, of the available public parking spaces and to the particular vehicle, based on determining that the closest available public parking space has become occupied; and
provide, to the particular vehicle device, data identifying the next closest available public parking space.

10. The device of claim 7, wherein the one or more processors are further configured to:
receive additional parking data identifying one or more public parking lots;
modify the parking data, based on the additional parking data, to generate modified parking data; and
identify the available public parking spaces in the geographical area based on the second vehicle data and the modified parking data.

11. The device of claim 7, wherein the one or more processors are further configured to:
reduce the particular dimensions of the clusters of the geographical area,
wherein reducing the particular dimensions increases an accuracy of the parking data identifying public parking spaces in the geographical area relative to the parking data associated with the particular dimensions.

12. The device of claim 7, wherein the one or more processors, when processing the data identifying the clusters of the geographical area and the first vehicle data, with the machine learning model, to determine the parking data, are to:
periodically process, over a predetermined time period, the data identifying the clusters of the geographical area and the first vehicle data, with the machine learning model, to determine the parking data.

13. A non-transitory computer-readable medium storing instructions, the instructions comprising:
one or more instructions that, when executed by one or more processors, cause the one or more processors to:
receive geographical data identifying a geographical area in which vehicles are parked in parking spaces;
receive, from vehicle devices of the vehicles, first vehicle data identifying engine off conditions, locations during engine off conditions, and durations of the engine off conditions;
divide, based on the geographical data, the geographical area into clusters with particular dimensions;
process data identifying the clusters of the geographical area and the first vehicle data, with a machine learning model, to determine parking data identifying public parking spaces in the geographical area;
receive, from a set of the vehicle devices associated with vehicles parked in the public parking spaces, second vehicle data identifying engine on conditions and locations during the engine on conditions;
identify available public parking spaces in the geographical area based on the second vehicle data and the parking data;
store data identifying the available public parking spaces in a data structure; and
perform one or more actions based on the data identifying the available public parking spaces,
wherein the one or more actions include:
receiving, from a particular vehicle device of a particular vehicle, a current location of the particular vehicle and a request to locate parking within a region of the geographical area,
identifying one or more of the available public parking spaces based on the data identifying the available public parking spaces, the current location of the particular vehicle, and the request to locate parking, and
providing, to the particular vehicle device, a user interface that includes locations of and directions to the one or more of the available public parking spaces.

14. The non-transitory computer-readable medium of claim 13, wherein the one or more instructions, that cause the one or more processors to process the data identifying the clusters of the geographical area and the first vehicle data, with a machine learning model, to determine the parking data, cause the one or more processors to:
establish a threshold time period associated with the durations of the engine off conditions;
establish a threshold quantity of the engine off conditions;
establish a threshold quantity of the vehicles associated with the engine off conditions; and determine the parking data identifying the public parking spaces in the geographical area based on the threshold time period, the threshold quantity of the engine off conditions, and the threshold quantity of the vehicles associated with the engine off conditions.

15. The non-transitory computer-readable medium of claim 13, wherein the one or more instructions, that cause the one or more processors to perform the one or more actions, cause the one or more processors to:
modify, over time, representations of the one or more of the available public parking spaces in the user interface to generate a modified user interface; and
provide the modified user interface to the particular vehicle device.

16. The non-transitory computer-readable medium of claim 13, wherein the one or more instructions, that cause the one or more processors to perform the one or more actions, cause the one or more processors to:
continuously identify additional available public parking spaces, of the available public parking spaces, based on the data identifying the available public parking spaces, the current location of the particular vehicle, and the request to locate parking,
wherein the additional available public parking spaces are identified until the particular vehicle parks; and
provide, to the particular vehicle device, another user interface that includes locations of and directions to the additional available public parking spaces.

17. The non-transitory computer-readable medium of claim 13, wherein the instructions further comprise:
one or more instructions that, when executed by the one or more processors, cause the one or more processors to:
receive additional parking data identifying one or more public parking lots;
modify the parking data, based on the additional parking data, to generate modified parking data; and
identify the available public parking spaces in the geographical area based on the second vehicle data and the modified parking data.

18. The non-transitory computer-readable medium of claim 13, wherein the instructions further comprise:
one or more instructions that, when executed by the one or more processors, cause the one or more processors to:
reduce the particular dimensions of the clusters of the geographical area,
wherein reducing the particular dimensions increases an accuracy of the parking data identifying public parking spaces in the geographical area relative to the parking data associated with the particular dimensions.

19. The method of claim 1, further comprising:
adjusting the particular dimensions of the clusters of the geographical area,
wherein adjusting the particular dimensions increases an accuracy of the parking data identifying public parking spaces in the geographical area relative to the parking data associated with the particular dimensions.

20. The method of claim 1, wherein the determining parking data identifying public parking spaces in the geographical area comprises determining whether the durations of the engine off conditions satisfy an engine off duration parameter threshold.

* * * * *